United States Patent
Hsu et al.

(10) Patent No.: US 7,155,730 B2
(45) Date of Patent: Dec. 26, 2006

(54) STRUCTURE FOR QUICKLY INSTALLING AND REMOVING AN OPTICAL DISK DRIVE

(75) Inventors: Hsin-An Hsu, Sanchong (TW); Che-Fu Yeh, Sindian (TW)

(73) Assignee: First International Computer, Inc., Taipei (TW)

( * ) Notice: Subject to any disclaimer, the term of this patent is extended or adjusted under 35 U.S.C. 154(b) by 429 days.

(21) Appl. No.: 10/824,470

(22) Filed: Apr. 15, 2004

(65) Prior Publication Data

US 2005/0235295 A1 Oct. 20, 2005

(51) Int. Cl.
G11B 33/02 (2006.01)
(52) U.S. Cl. ..................................... 720/600
(58) Field of Classification Search ............... 720/600, 720/601, 619, 620, 628, 657; 369/77.11, 369/77.21, 75.11, 75.21
See application file for complete search history.

(56) References Cited

U.S. PATENT DOCUMENTS

2005/0044556 A1* 2/2005 Hsu ........................... 720/600
2006/0015882 A1* 1/2006 Murata et al. ............... 720/600

* cited by examiner

Primary Examiner—Allen Cao
(74) Attorney, Agent, or Firm—Bacon & Thomas, PLLC

(57) ABSTRACT

The present invention is to provide a structure for quickly installing and removing an optical disk drive comprising an optical disk drive frame and a main frame, wherein the optical disk drive frame has a vertical wall surface on one side, a side bracket on the other side, a sliding channel disposed adjacent to the side bracket, a latch member disposed on the sliding channel and capable of moving along the sliding channel back and forth, and a push button disposed at the bottom of the latch member. When an optical disk drive is mounted onto the optical disk drive frame, the push button is pushed to move the latch member forward and press against the edge of the optical disk drive, enabling the optical disk drive to be fixed onto the optical disk drive frame.

6 Claims, 9 Drawing Sheets

STRUCTURE FOR QUICKLY INSTALLING AND REMOVING AN OPTICAL DISK DRIVE

FIELD OF THE INVENTION

The present invention relates to a structure for installing and removing an optical disk drive, more particularly to a assembly structure comprising an optical disk drive frame and a main frame, wherein the main frame is disposed in a casing of an electronic device and has an opening on one end and an embedding member disposed on the bottom of the opening at a position proximate the edge of the opening. The embedding member has a handle disposed on one end and two embedding latches symmetrically disposed on the other end and protruded from the opening. Two embedding grooves corresponding to the embedding latches are symmetrically disposed on the optical disk drive frame at one end, and a first side plate and a second side plate are disposed on the optical disk drive frame at the places for matching with the corresponding two embedding latches. When detaching the optical disk drive from the electronic device for repairing, it only needs to pull the handle, enabling the two embedding latches to slide along the corresponding side plates and push the optical disk drive out of the electronic device and achieving the goal of quickly removing an optical disk drive from an electronic device.

BACKGROUND OF THE INVENTION

Please refer to FIG. 1 for the traditional structure for retaining an optical disk drive of a computer, wherein a frame 10 is disposed in a cavity of a computer for accommodating an optical disk drive 2; a plurality of through holes 13 is disposed on the wall surface 11 at both sides of the frame 10; a screw 15 is secured into the through hole 13; and a screw hole 16 is disposed on the optical disk drive 2 at a position corresponding to the through hole 13 such that when the optical disk drive 2 is installed onto the frame 10, the screw 15 passes through the through hole 13 of the frame 10 and is secured into the screw hole 16 of the optical disk drive 2, so that the optical disk drive 2 is fixed into the cavity of the computer and electrically coupled to the computer for transmitting signals.

However, once the optical disk drive 2 is fixed into the computer, it is not easy to remove the optical disk drive 2. If it is necessary to repair the optical disk drive 2 when it breaks down, then the computer casing must be opened first before removing the optical disk drive 2 from the frame 10 inside the computer, which is very inconvenient.

SUMMARY OF THE INVENTION

In view of the foregoing shortcomings of the traditional structure for fixing an optical disk drive, the present invention provides a quick assembly structure for installing and removing an optical disk drive. The primary objective of the present invention is to provide a structure for quickly assembling a detachable optical disk drive and facilitating the maintenance of the optical disk drive when the optical disk drive breaks down.

To achieve the foregoing objective, the present invention comprises an optical disk drive frame and a main frame, wherein the optical disk drive frame has a vertical wall on one side and a side bracket on the other side. A sliding channel is disposed on one side of the side bracket, and a latch member is disposed on the sliding channel, such that the latch member slides back and forth in the axial direction along the sliding channel, and an inverted L-shaped limit section vertically disposed on the corresponding side of the side bracket, and a push button is disposed at the bottom of the latch member, so that when an optical disk drive is installed onto the optical disk drive frame, the push button is pressed to drive the latch member and press the edge of the optical disk drive, and thus fixing the optical disk drive onto the optical disk drive frame. The main frame is disposed in a casing of an electronic device, and the main frame has an opening on one end, and an embedding member is disposed on the bottom of the opening at a position proximate the edge of the opening. The embedding member has a handle disposed on one end and two embedding latches symmetrically disposed on the other end and protruded from the opening. Two embedding groove corresponding to the embedding latches are symmetrically disposed on the optical disk drive frame, a first side plate and a second side plate are disposed on the optical disk drive frame at the places for matching with the corresponding two embedding latches, so, that when the optical disk drive is mounted onto the optical disk drive frame, the optical disk drive can be put into the electronic device through the opening of the main frame. By embedding the embedding latches into the side plates, the optical disk drive is fixed into the electronic device. If it is necessary to remove the optical disk drive, the handle is pulled so that the embedding latches slide and separate from the side plates and pushes the optical disk drive out of the electronic device.

The above and other objects, features and advantages of the present invention will become apparent from the following detailed description taken with the accompanying drawings.

DETAILED DESCRIPTION OF THE PREFERRED EMBODIMENTS

Figure 1:
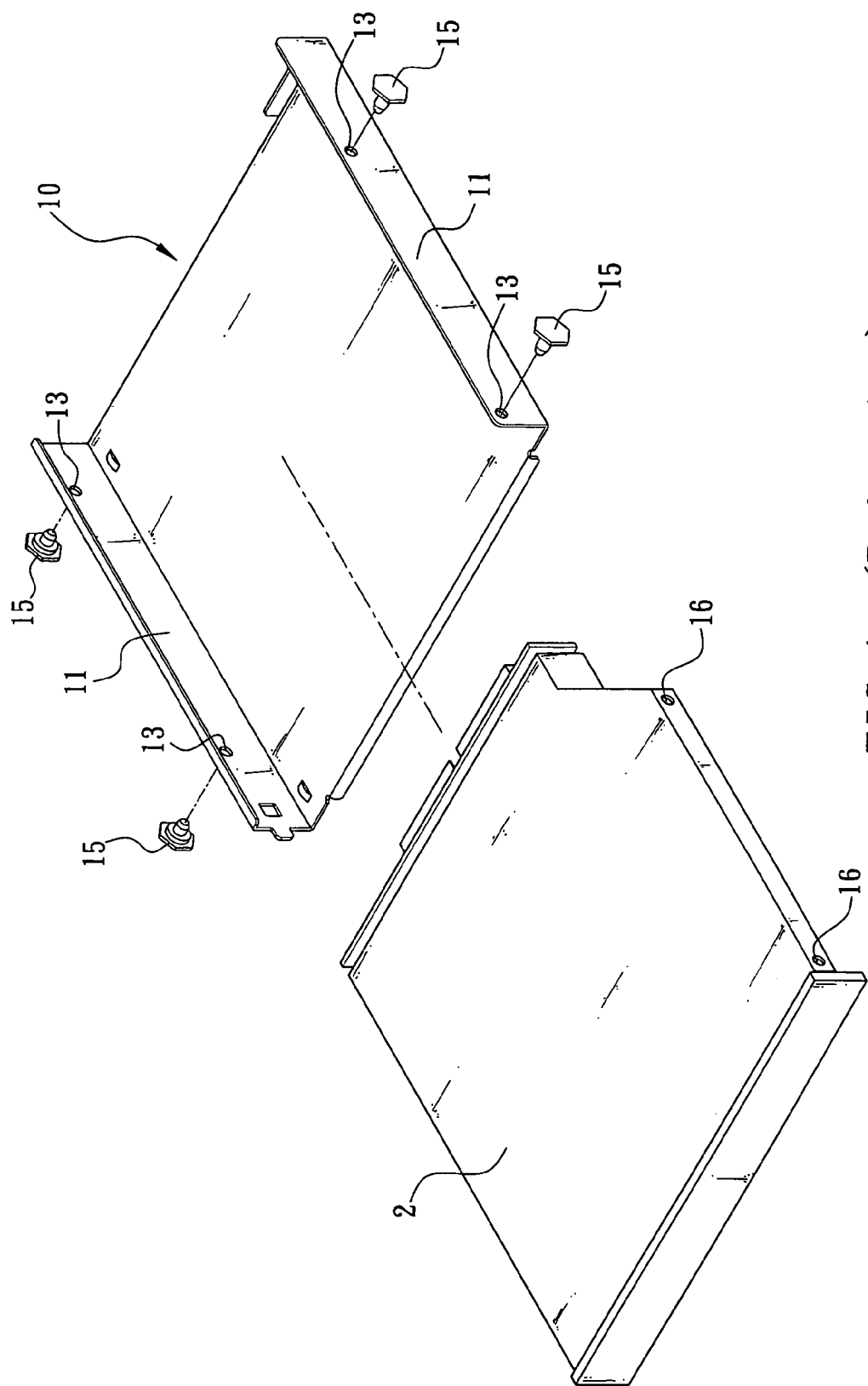
FIG. 1 is a perspective view of the prior art.
Figure 2:
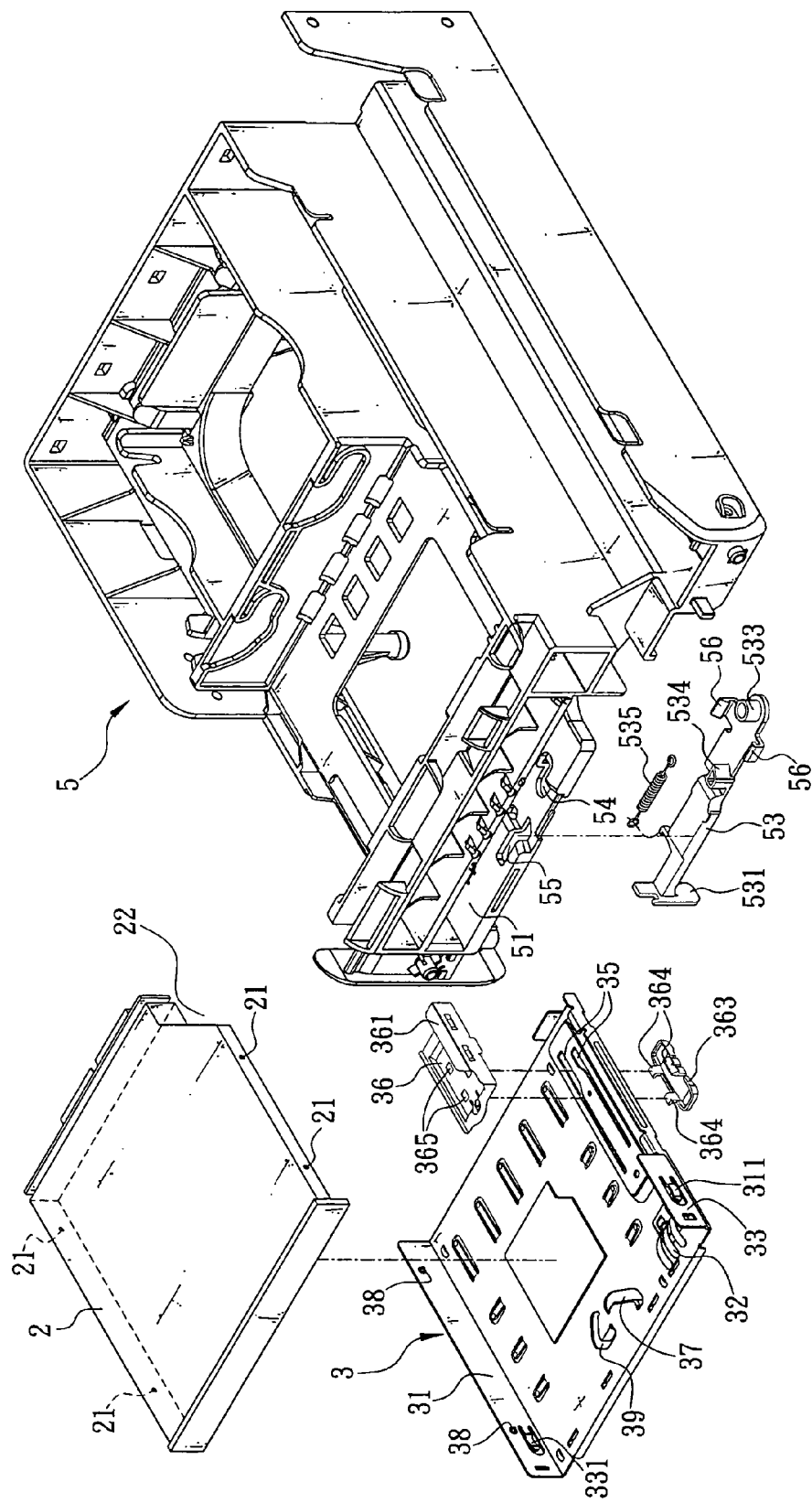
FIG. 2 is a perspective view of the disassembled parts of the structure according to the present invention.
Figure 3:
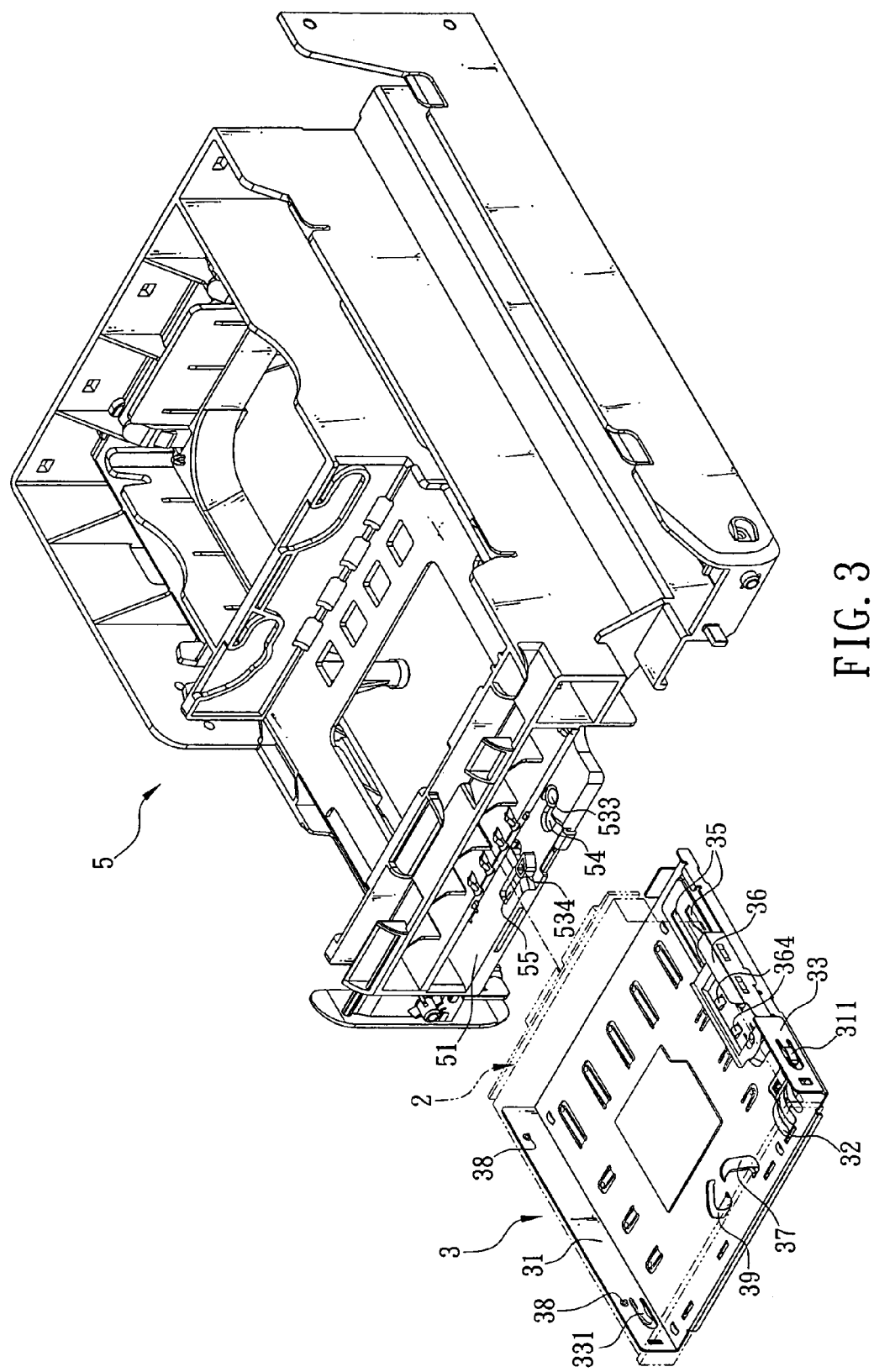
FIG. 3 is a perspective view of the present invention.

Please refer to FIGS. 2 and 3 showing a structure for installing and removing an optical disk drive according to the present invention. The structure comprises an optical disk drive frame 3 and a main frame 5, wherein the optical disk drive frame 3 has a vertical wall surface 31 on one side and a side bracket 33 on the other side. A sliding channel is disposed on the optical disk drive frame 3 adjacent to the side bracket 33, and the sliding channel has a symmetrical open groove 35. A latch member 36 is disposed on the open groove 35 and capable of moving along the axial direction of the open groove 35 back and forth, and an inverted L-shaped limit section 361 is disposed on a corresponding side of the side bracket 33, and a push button 363 is disposed at the bottom of the latch member 36, and a plurality of fixed legs extended upward is disposed at the edge of the push button 363. Please refer to FIGS. 3 and 4. The end of each fixed leg has an embedding latch 364, and such fixed leg passes into the open groove 35 and the end of the embedding latch 364 latches the hole 365 on the latch member 36, such that the latch member 36 and the push button 363 are coupled together, enabling the latch member 36 to be pushed by the push button 363 along the axial direction of the open groove 35 back and forth.

When an optical disk drive 2 is mounted onto the optical disk drive frame 3, the latch member 36 is first pulled back and one side of the optical disk drive 2 is then placed to the position against the wall surface 31 of the optical disk drive frame 3, enabling small protrusions 38 on the wall surface 31 to be embedded screw holes 21 on the same side of the optical disk drive 2 and allowing the space 22 left on another side of the optical disk drive 2 to pass through the latch member 36. Thus, the another side of the optical disk drive 2 is able to be slowly placed on the optical disk drive frame 3. When the latch member 36 is pushed forward, the inverted L-shaped limit section 361 of the latch member 36 is moved forward to press against the edge of the another side of the optical disk drive 2, enabling the optical disk drive 2 to be fixed onto the optical disk drive frame 3.

Figure 4:
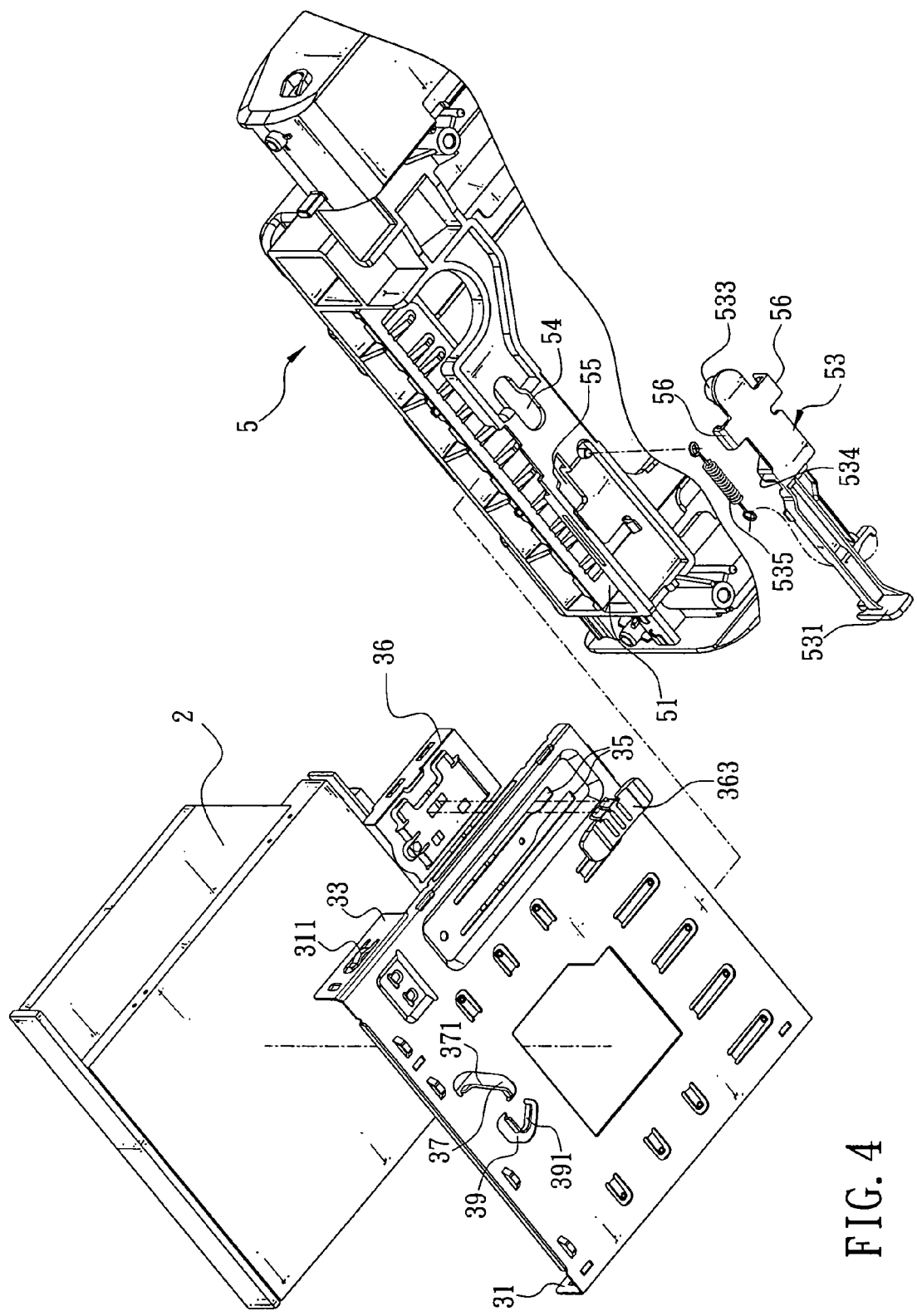
FIG. 4 is a partial view of the disassembled parts of the structure according to the present invention.

Please refer to FIGS. 2 and 4. The main frame 5 is installed into a casing of an electronic device (such as a computer). The main frame 5 has an opening 51 on one end; the bottom of the opening 51 proximate the edge of the front end has a transversal board; and a sliding channel on the transversal board. An embedding member 53 is disposed on the sliding channel of the transversal board, and extends outward on both sides along with a hook 56 on each side, and the end of the hook 56 is extended upward to cover the transversal board, so that the embedding member 53 can move sideway in the sliding channel. The embedding member 53 at an end away from the middle of the opening 51 has a downwardly extended handle 531, and a first embedding latch 533 and a second embedding latch 534 are symmetrically disposed on the other end, wherein the first embedding latch 533 is in a cylinder shape and the second embedding latch 534 is of a trapezoid cross section. The main frame 5 has a first transversal sliding channel 54 and a second transversal sliding channel 55 at the positions corresponding to the first and second embedding latches 533, 534, and the first and second embedding latches 533, 534 are respectively disposed in the first and second sliding channels 54, 55 and partially exposed from the sliding channels 54, 55, so that when the handle 531 is pulled, the first and second embedding latches 533, 534 can slide sideway in the first and second sliding channels 54, 55 respectively. Please refer to FIGS. 4 and 5, a reciprocating spring 535 is disposed on the embedding member 53, and one end of the reciprocating spring 535 is coupled to the embedding member 53 and the other end is coupled to the main frame 5, so that after the embedding member 53 is moved, the embedding member 53 will return to its original position due to the resilience of the spring 535.

Figure 5:
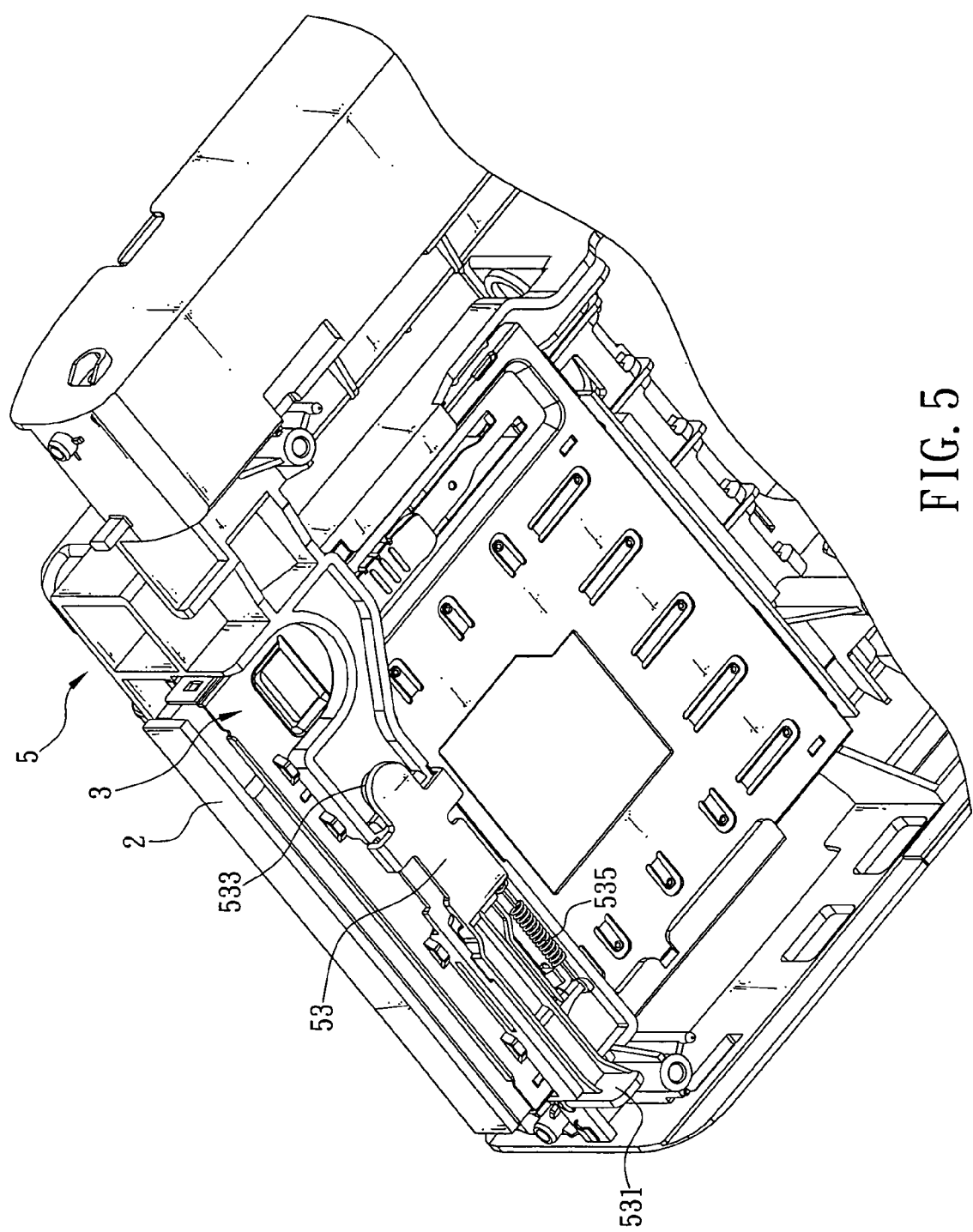
FIG. 5 is a perspective view of the assembled structure according to the present invention.
Figure 6:
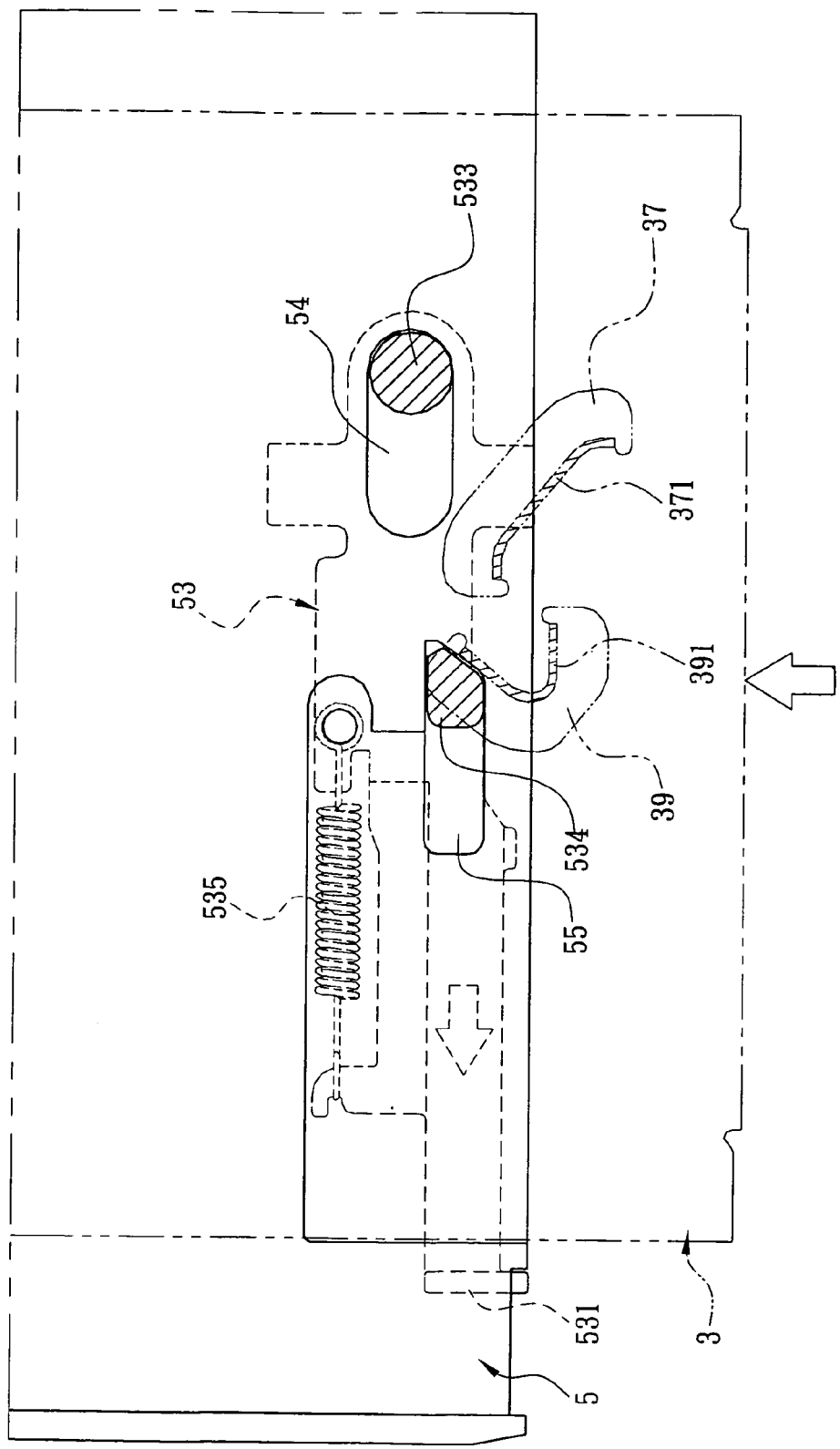
FIG. 6 is an action view of assembling the optical disk drive frame into the main frame according to the present invention.
Figure 7:
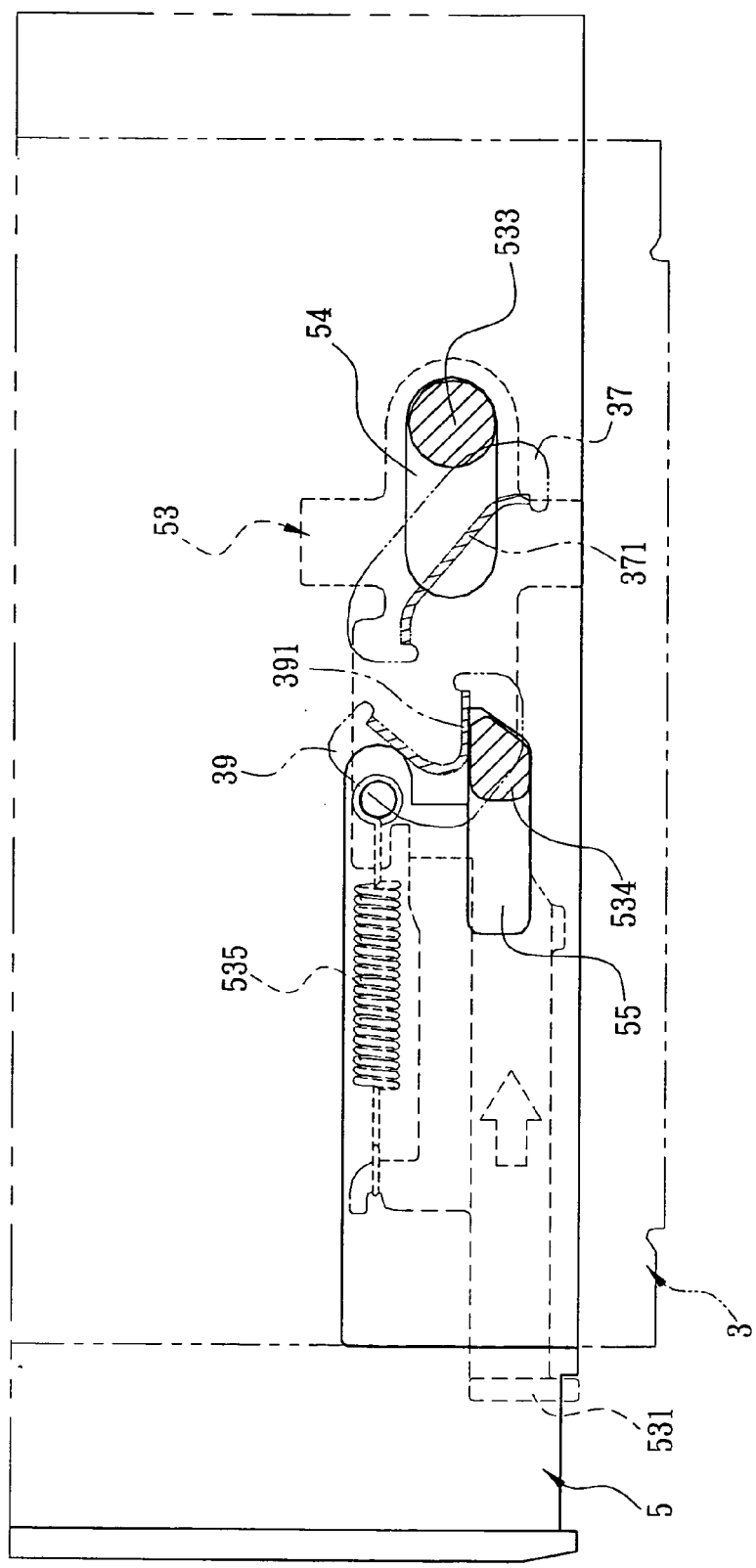
FIG. 7 is another action view of assembling the optical disk drive frame into the main frame according to the present invention.
Figure 8:
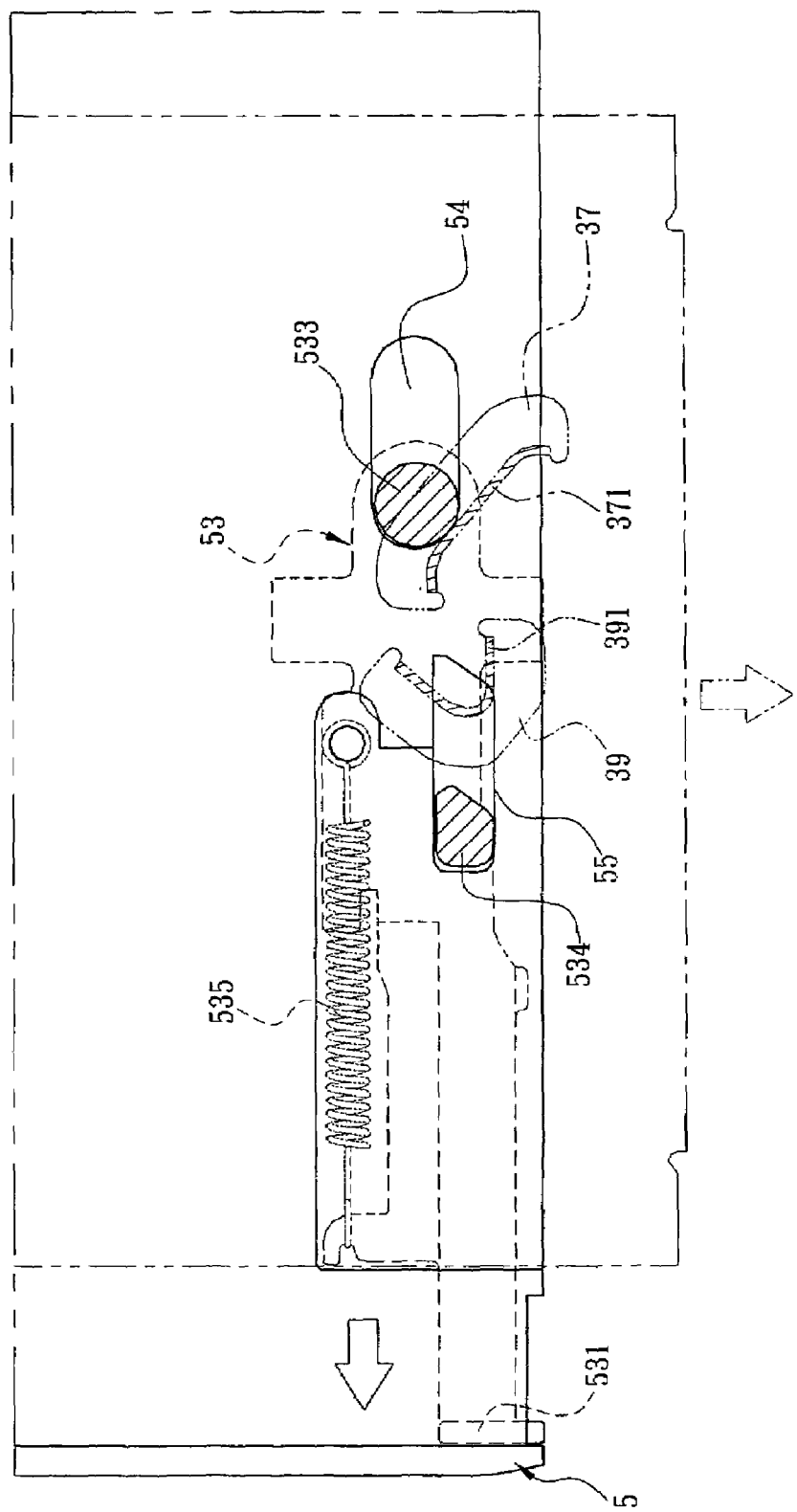
FIG. 8 is an action view of disassembling the optical disk drive frame from the main frame according to the present invention.
Figure 9:
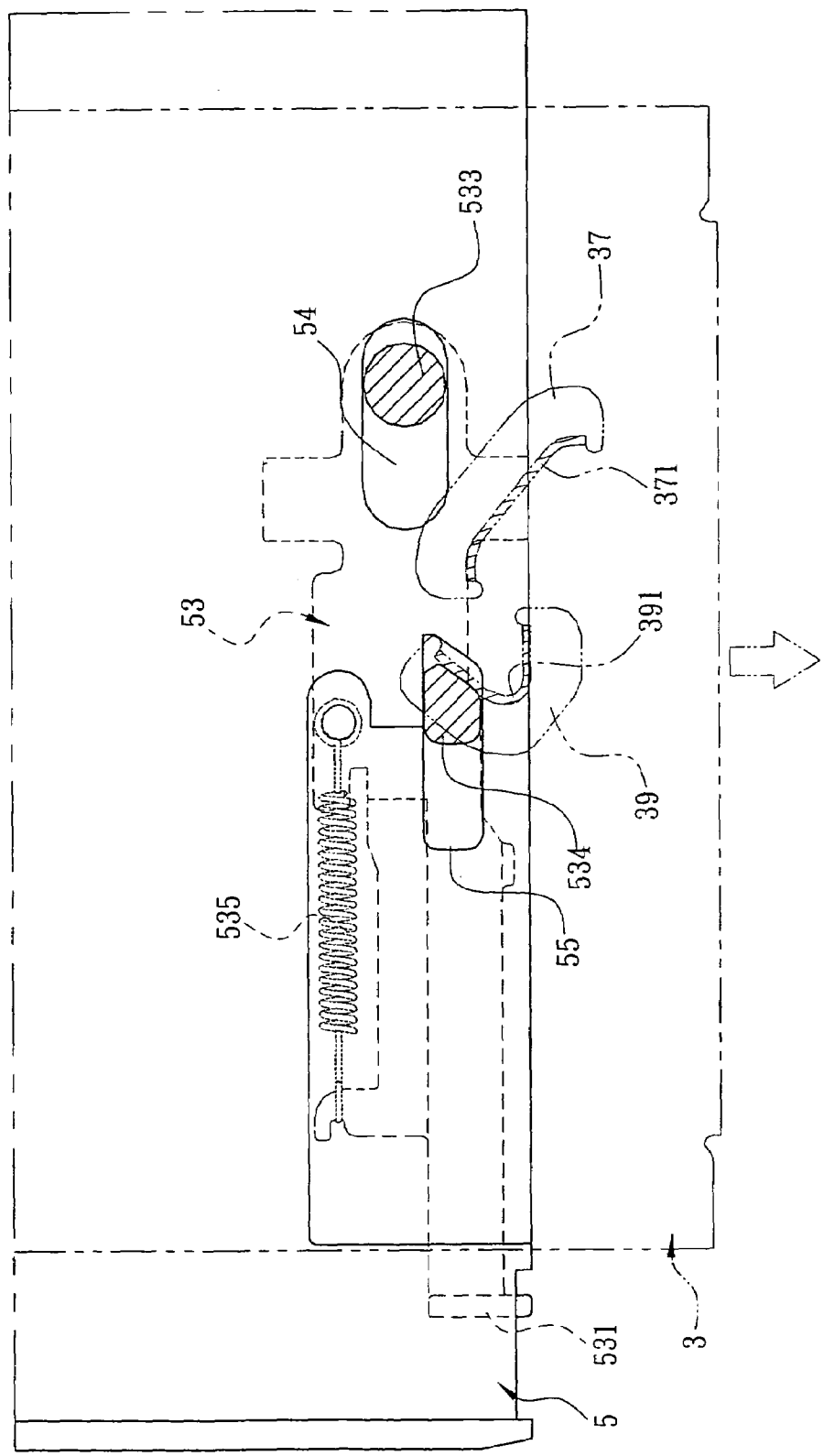
FIG. 9 is another action view of disassembling the optical disk drive frame from the main frame according to the present invention.

Again referring to FIGS. 4 and 5, the optical disk drive frame 3 at the ends corresponding to the first and second embedding latches 533, 534 are symmetrically stamped with a transversal embedding groove 37 and a L-shaped embedding groove 39. The bottom sides of the transversal embedding groove 37 and the L-shaped embedding groove 39 respectively have a transversal first side plate 371 and a L-shaped second side plate 391 for matching with the corresponding first and second embedding latches 533, 534 (as shown in FIG. 4). Please refer to FIGS. 5 and 6 showing the action of placing the optical disk drive frame 3 into the main frame 5, when the optical disk drive frame 3 is placed into the main frame 5, the second embedding latch 534 of the embedding member 53 is slidably moved against the L-shaped second side plate 391. And, when the second embedding latch 534 is moved along the L-shaped second side plate 391, through utilizing the slope on the rear side of the L-shaped second side plate 391, the embedding member 53 is then able to be pushed to the left side, and the first embedding latch 533 of the embedding member 53 is then moved away from the transversal first side plate 371 and entering into the bottom of the optical disk drive frame 3 (as shown in FIG. 6). When the second embedding latch 534 is moved upward to the upper edge of the L-shaped second side plate 391, the force pushing the embedding member 53 disappears and the second embedding latch 534 is pulled back to the original position by the embedding member 53 through using the resilient force of the spring 535. Thus, the second embedding latch 534 enters into the horizontal bottom of the L-shaped second side plate 391 and blocks the horizontal bottom for firmly fixing the optical disk drive frame 3 inside the main frame 5. Please refer to FIGS. 8 and 9 showing the action of detaching the optical disk drive frame 3 from the main frame 5, when the optical disk drive frame 3 is detached from the main frame 5, the handle 531 of the embedding member 53 is pulled back, enabling the embedding member 53 to be pulled to the left side and allowing the second embedding latch 534 to be detached from the bottom edge of the L-shaped second side plate 391. At the same moment, the first embedding latch 534 is slidably moved against the transversal first side plate 371 and push the optical disk drive frame 3 out of the main frame 5.

By means of the foregoing components, as referring to FIGS. 3 and 5, when the optical disk drive 2 is fixed onto the optical disk drive frame 3 and is installed into the electronic device through the opening 51 of the main frame 5, the first and second embedding latches 533, 534 are respectively matched with the transversal first side plate 371 and the L-shaped second side plate 391, enabling the optical disk drive frame 3 along with the optical disk drive 2 fixed thereon to be installed into the electronic device. If it is necessary to remove the optical disk drive frame 3 along with the optical disk drive 2, the handle 531 is pulled to enable the first and second embedding latches 533, 534 to slide along the transversal first side plate 371 and the L-shaped second side plate 391 respectively and to be separated from the side plates 371, 391, pushing optical disk drive frame 3 out of the electronic device.

Again referring to FIGS. 2 and 3 for the invention, when detaching the optical disk drive 2 from the optical disk drive frame 3, it merely needs to push the push button 363 rearward in order to let the limit section 361 of the latch member 36 release from the edge of the optical disk drive 2 and enter into the space 22, the optical disk drive 2 is thus separated from the optical disk drive frame 3 and detached from the optical disk drive frame 3.

Please refer to FIGS. 2 and 3 again. A symmetrical resilient bracket 311, 331 is stamped from the front ends of the wall surface 31 and the side bracket 33 respectively, so that when the optical disk drive 2 is installed onto the optical disk drive frame 3, the resilience of the resilient bracket 311, 331 can fix the optical disk drive onto the optical disk drive frame 3.

Please refer to FIGS. 2 and 3 again. A ground bracket is disposed on the optical disk drive frame 3, so that when the optical disk drive 2 is installed onto the optical disk drive frame 3, the ground bracket 32 presses on the surface of the optical disk drive to define a ground circuit and prevent electromagnetic interference (EMI).

Therefore, if the optical disk drive 2 breaks down, the optical disk drive 2 can be detached quickly to facilitate the repair and maintenance of the optical disk drive 2 and achieve the purpose of saving time and effort.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A structure for quickly installing and removing an optical disk drive, comprising:

a main frame, disposed in a casing of an electronic device, and one end of said main frame having an opening, a transversal board disposed at the bottom of said opening proximate the front edge of said opening; a sliding channel disposed on said transversal board;

an embedding member, disposed on said sliding channel of said transversal board, and both edges of said embedding member being extended outward and having a hook thereon, one end of each said hooks being extended upward to cover said transversal board, such that said embedding member being capable of sliding in said sliding channel; said embedding member having a downwardly extended handle at an end away from the middle of said opening and a first embedding latch and a second embedding latch symmetrically disposed on the other end, wherein said first embedding latch is in a cylinder shape and said second embedding latch is of a trapezoid cross section; said main frame respectively having a first transversal sliding channel and a second transversal sliding channel at the positions corresponding to said first and second embedding latches, and said first and second embedding latches respectively disposed in said first and second transversal sliding channels and partially exposed from said transversal sliding channels, so that when said handle being pulled, said first and second embedding latches can slide in said first and second transversal sliding channels respectively; a reciprocating spring disposed on said embedding member, having one end coupled to said embedding member and another end coupled to said main frame, so that after said embedding member is pulled, said embedding member will return to its original position due to the resilience of said spring; and an optical disk drive frame, having a vertical wall on one side and a side bracket on the other side, and said optical disk drive frame at the ends corresponding to said first and second embedding latches are symmetrically stamped with a transversal first side plate and a L-shaped second side plate;

thereby when said optical disk drive being mounted onto said optical disk drive frame and placed into said electronic device through said opening of said main frame, said optical disk drive frame being fixed onto said electronic device while said second embedding latch being embedded into said L-shaped second side plate, or said optical disk drive frame being detached from said electronic device while said first embedding latch being pressed against said transversal first side plate.

2. The structure for quickly installing and removing said optical disk drive of claim 1 further comprises a sliding channel, being disposed on said optical disk drive frame adjacent to said side bracket, and said sliding channel has a symmetrical open groove; a latch member, being disposed on said open groove and capable of moving back and forth in said open groove along the axial direction of said open groove, and comprising a vertical inverted L-shaped limit section disposed on one edge corresponding to said side bracket, a push button disposed on the bottom of said latch member, and a plurality of upwardly extended fixed legs disposed on the edge of said push button and passing through said open groove with its end being coupled to said push button; thereby when an optical disk drive is installed onto said optical disk drive frame, said push button is pushed to drive the limit section of said latch member to press against an edge of said optical disk drive and fix said optical disk drive onto said optical disk drive frame.

3. The structure for quickly installing and removing an optical disk drive of claim 2, wherein the end of each said fixed leg has an embedding latch passing into said open groove, and the end of said embedding latch latches said hole on said latch member, enabling said latch member and said push button to be coupled together.

4. The structure for quickly installing and removing an optical disk drive of claim 2 further comprising a symmetrical resilient bracket respectively disposed on the wall of said optical disk drive frame and the front end of said side bracket, such that when said optical disk drive being mounted onto said optical disk drive frame, said optical disk drive being fixed onto said optical disk drive frame by the resilience of said resilient bracket.

5. The structure for quickly installing and removing an optical disk drive of claim 2, wherein said optical disk drive frame comprises a ground bracket, so that when said optical disk drive is mounted onto said optical disk drive, said ground bracket presses on the surface of said optical disk drive to define a ground circuit and prevent electromagnetic interference.

6. The structure for quickly installing and removing an optical disk drive of claim 1, wherein said electronic device is a computer.

* * * * *